(12) United States Patent
Zamora et al.

(10) Patent No.: US 10,301,526 B2
(45) Date of Patent: *May 28, 2019

(54) RESIN SEALANT FOR ZONAL ISOLATION AND METHODS FOR MAKING AND USING SAME

(71) Applicant: Weatherford Technology Holdings, LLC, Houston, TX (US)

(72) Inventors: Frank Zamora, Ft. Worth, TX (US); Sarkis R. Kakadjian, Houston, TX (US); Tina Garza, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,027

(22) Filed: Nov. 3, 2014

(65) Prior Publication Data

US 2015/0051311 A1 Feb. 19, 2015

Related U.S. Application Data

(63) Continuation of application No. 12/784,479, filed on May 20, 2010, now Pat. No. 8,899,328.

(51) Int. Cl.
| | | |
|---|---|---|
| *E21B 33/13* | (2006.01) | |
| *C09K 8/44* | (2006.01) | |
| *C04B 26/14* | (2006.01) | |
| *E21B 33/138* | (2006.01) | |

(52) U.S. Cl.
CPC .............. *C09K 8/44* (2013.01); *C04B 26/14* (2013.01); *E21B 33/13* (2013.01); *E21B 33/138* (2013.01)

(58) Field of Classification Search
CPC .......... E21B 43/26; E21B 33/13; E21B 33/14; E21B 33/12
USPC ................................. 166/295, 300, 285, 292
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,805,958 A | 7/1959 | Bueche et al. | 106/308 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |

(Continued)

FOREIGN PATENT DOCUMENTS

| | | |
|---|---|---|
| CA | 2125513 | 1/1995 |
| DE | 4027300 | 3/1992 |

(Continued)

*Primary Examiner* — Silvana C Runyan
(74) *Attorney, Agent, or Firm* — Vorys, Sater, Seymour and Pease LLP (57) ABSTRACT

Epoxy-based zonal isolation compositions are capable of being adjusted by varying the epoxy-based compositions for isolating zones in borehole of oil and gas wells under high-temperature, mid-temperature and low-temperature conditions.

15 Claims, 5 Drawing Sheets

(56) References Cited

U.S. PATENT DOCUMENTS

| | | | | |
|---|---|---|---|---|
| 3,960,736 A | 6/1976 | Free et al. | | 507/216 |
| 3,965,982 A | 6/1976 | Medlin | | 166/249 |
| 3,990,978 A | 11/1976 | Hill | | 507/235 |
| 4,007,792 A | 2/1977 | Meister | | 166/308.2 |
| 4,052,159 A | 10/1977 | Fuerst et al. | | |
| 4,067,389 A | 1/1978 | Savins | | 166/246 |
| 4,108,782 A | 8/1978 | Thompon | | 507/205 |
| 4,112,050 A | 9/1978 | Sartori et al. | | 423/223 |
| 4,112,051 A | 9/1978 | Sartori et al. | | 423/223 |
| 4,112,052 A | 9/1978 | Sartori et al. | | 423/223 |
| 4,113,631 A | 9/1978 | Thompson | | 507/202 |
| 4,378,845 A | 4/1983 | Medlin et al. | | 166/297 |
| 4,385,935 A | 5/1983 | Skjeldal | | 106/607 |
| 4,461,716 A | 7/1984 | Barbarin et al. | | 252/307 |
| 4,479,041 A | 10/1984 | Fenwick et al. | | 200/81 R |
| 4,506,734 A | 3/1985 | Nolte | | 166/308.1 |
| 4,514,309 A | 4/1985 | Wadhwa | | 507/211 |
| 4,541,935 A | 9/1985 | Constien et al. | | 507/225 |
| 4,549,608 A | 10/1985 | Stowe et al. | | 166/280.1 |
| 4,561,985 A | 12/1985 | Glass, Jr. | | 507/108 |
| 4,623,021 A | 11/1986 | Stowe | | 166/250.1 |
| 4,654,266 A | 3/1987 | Kachnik | | 428/403 |
| 4,657,081 A | 4/1987 | Hodge | | 166/380.5 |
| 4,660,643 A | 4/1987 | Perkins | | 166/283 |
| 4,683,068 A | 7/1987 | Kucera | | 507/201 |
| 4,686,052 A | 8/1987 | Baranet et al. | | 507/244 |
| 4,695,389 A | 9/1987 | Kubala | | 507/244 |
| 4,705,113 A | 11/1987 | Perkins | | 166/302 |
| 4,714,115 A | 12/1987 | Uhri | | 166/308.1 |
| 4,718,490 A | 1/1988 | Uhri | | 166/281 |
| 4,724,905 A | 2/1988 | Uhri | | 166/250.1 |
| 4,725,372 A | 2/1988 | Teot et al. | | 507/129 |
| 4,739,834 A | 4/1988 | Peiffer et al. | | 166/308.4 |
| 4,741,401 A | 5/1988 | Walles et al. | | 166/300 |
| 4,748,011 A | 5/1988 | Baize | | 423/228 |
| 4,779,680 A | 10/1988 | Sydansk | | 166/300 |
| 4,795,574 A | 1/1989 | Syrinek et al. | | 507/238 |
| 4,817,717 A | 4/1989 | Jennings, Jr. et al. | | 166/278 |
| 4,830,106 A | 5/1989 | Uhri | | 166/250.1 |
| 4,846,277 A | 7/1989 | Khalil et al. | | 166/280.1 |
| 4,848,468 A | 7/1989 | Hazlett et al. | | 166/300 |
| 4,852,650 A | 8/1989 | Jennings, Jr. et al. | | 166/250.1 |
| 4,869,322 A | 9/1989 | Vogt, Jr. et al. | | 166/280.1 |
| 4,892,147 A | 1/1990 | Jennings, Jr. et al. | | 166/280.2 |
| 4,926,940 A | 5/1990 | Stromswold | | 166/247 |
| 4,938,286 A | 7/1990 | Jennings, Jr. | | 166/280.1 |
| 4,978,512 A | 12/1990 | Dillon | | 423/226 |
| 5,005,645 A | 4/1991 | Jennings, Jr. et al. | | 166/280.1 |
| 5,024,276 A | 6/1991 | Borchardt | | 166/308.6 |
| 5,067,556 A | 11/1991 | Fudono et al. | | 62/196.4 |
| 5,074,359 A | 12/1991 | Schmidt | | 166/280.1 |
| 5,074,991 A | 12/1991 | Weers | | 208/236 |
| 5,082,579 A | 1/1992 | Dawson | | 507/211 |
| 5,106,518 A | 4/1992 | Cooney et al. | | 507/21 |
| 5,110,486 A | 5/1992 | Manalastas et al. | | 507/260 |
| 5,169,411 A | 12/1992 | Weers | | 44/421 |
| 5,224,546 A | 7/1993 | Smith et al. | | 166/300 |
| 5,228,510 A | 7/1993 | Jennings, Jr. et al. | | 166/263 |
| 5,246,073 A | 9/1993 | Sandiford et al. | | 166/295 |
| 5,259,455 A | 11/1993 | Nimerick et al. | | 166/308.5 |
| 5,330,005 A | 7/1994 | Card et al. | | 166/280.2 |
| 5,342,530 A | 8/1994 | Aften et al. | | 252/8.551 |
| 5,347,004 A | 9/1994 | Rivers et al. | | 544/180 |
| 5,363,919 A | 11/1994 | Jennings, Jr. | | 166/308.1 |
| 5,465,792 A | 1/1995 | Dawson et al. | | 166/295 |
| 5,402,846 A | 4/1995 | Jennings, Jr. et al. | | 166/259 |
| 5,411,091 A | 5/1995 | Jennings, Jr. | | 166/280.1 |
| 5,424,284 A | 6/1995 | Patel et al. | | 507/129 |
| 5,439,055 A | 8/1995 | Card et al. | | 166/280.2 |
| 5,462,721 A | 10/1995 | Pounds et al. | | 423/226 |
| 5,472,049 A | 12/1995 | Chaffe et al. | | 166/250.1 |
| 5,482,116 A | 1/1996 | El-Rabaa et al. | | 166/250.1 |
| 5,488,083 A | 1/1996 | Kinsey, III et al. | | 507/211 |
| 5,497,831 A | 3/1996 | Hainey et al. | | 166/308.1 |
| 5,501,275 A | 3/1996 | Card et al. | | 166/280.2 |
| 5,539,044 A | 7/1996 | Dindi et al. | | 524/570 |
| 5,551,516 A | 9/1996 | Norman et al. | | 166/308.2 |
| 5,624,886 A | 4/1997 | Dawson et al. | | 507/217 |
| 5,635,458 A | 6/1997 | Lee et al. | | 507/240 |
| 5,649,596 A | 7/1997 | Jones et al. | | 166/300 |
| 5,669,447 A | 9/1997 | Walker et al. | | 166/300 |
| 5,674,377 A | 10/1997 | Sullivan, III et al. | | 208/208 R |
| 5,688,478 A | 11/1997 | Pounds et al. | | 423/228 |
| 5,693,837 A | 12/1997 | Smith et al. | | 556/148 |
| 5,711,396 A | 1/1998 | Joerg et al. | | 180/444 |
| 5,722,490 A | 3/1998 | Ebinger | | 166/281 |
| 5,744,024 A | 4/1998 | Sullivan, III et al. | | 208/236 |
| 5,755,286 A | 5/1998 | Ebinger | | 166/281 |
| 5,775,425 A | 7/1998 | Weaver et al. | | 166/276 |
| 5,787,986 A | 8/1998 | Weaver et al. | | 166/280.2 |
| 5,806,597 A | 9/1998 | Tjon-Joe-Pin et al. | | 166/300 |
| 5,807,812 A | 9/1998 | Smith et al. | | 507/238 |
| 5,833,000 A | 11/1998 | Weaver et al. | | 166/276 |
| 5,853,048 A | 12/1998 | Weaver et al. | | 166/279 |
| 5,871,049 A | 2/1999 | Weaver et al. | | 166/276 |
| 5,875,844 A | 3/1999 | Chatterji et al. | | 166/293 |
| 5,877,127 A | 3/1999 | Card et al. | | 507/273 |
| 5,908,073 A | 6/1999 | Nguyen et al. | | 166/276 |
| 5,908,814 A | 6/1999 | Patel et al. | | 507/131 |
| 5,964,295 A | 10/1999 | Brown et al. | | 166/308.2 |
| 5,969,006 A | 10/1999 | Onan et al. | | 523/166 |
| 5,979,557 A | 11/1999 | Card et al. | | 166/300 |
| 5,980,845 A | 11/1999 | Cherry | | 423/229 |
| 6,001,887 A | 12/1999 | Keup et al. | | 516/118 |
| 6,016,871 A | 1/2000 | Burts, Jr. | | 166/300 |
| 6,035,936 A | 3/2000 | Whalen | | 166/308.5 |
| 6,047,772 A | 4/2000 | Weaver et al. | | 166/276 |
| 6,054,417 A | 4/2000 | Graham et al. | | 507/238 |
| 6,059,034 A | 5/2000 | Rickards et al. | | 166/280.2 |
| 6,060,436 A | 5/2000 | Synder et al. | | 507/266 |
| 6,063,972 A | 5/2000 | Duncum et al. | | 585/15 |
| 6,069,118 A | 5/2000 | Hinkel | | 507/277 |
| 6,123,394 A | 9/2000 | Jeffrey | | 299/16 |
| 6,133,205 A | 10/2000 | Jones | | 507/276 |
| 6,147,034 A | 11/2000 | Jones et al. | | 507/238 |
| 6,162,449 A | 12/2000 | Maier et al. | | 424/401 |
| 6,162,766 A | 12/2000 | Muir et al. | | 507/267 |
| 6,169,058 B1 | 1/2001 | Le et al. | | 507/222 |
| 6,228,812 B1 | 5/2001 | Dawson et al. | | 507/221 |
| 6,247,543 B1 | 6/2001 | Patel et al. | | 175/64 |
| 6,267,938 B1 | 7/2001 | Warrender et al. | | 423/226 |
| 6,283,212 B1 | 9/2001 | Hinkel et al. | | 166/279 |
| 6,291,405 B1 | 9/2001 | Lee et al. | | 507/136 |
| 6,330,916 B1 | 12/2001 | Rickards et al. | | 166/280.2 |
| 6,725,931 B2 | 4/2004 | Nguyen et al. | | 166/280.2 |
| 6,756,345 B2 | 6/2004 | Pakulski et al. | | 507/246 |
| 6,793,018 B2 | 9/2004 | Dawson et al. | | 166/300 |
| 6,832,650 B2 | 12/2004 | Nguyen et al. | | 166/279 |
| 6,858,566 B1 * | 2/2005 | Reddy et al. | | 507/202 |
| 6,875,728 B2 | 4/2005 | Gupta et al. | | 507/240 |
| 7,055,628 B2 | 6/2006 | Grainger et al. | | 175/66 |
| 7,140,433 B2 | 11/2006 | Gatlin et al. | | 166/250.01 |
| 7,186,353 B2 | 3/2007 | Novak | | 252/70 |
| 7,268,100 B2 | 9/2007 | Kippie et al. | | 507/244 |
| 7,350,579 B2 | 4/2008 | Gatlin et al. | | 166/308.3 |
| 7,392,847 B2 | 7/2008 | Gatlin et al. | | 166/280.2 |
| 7,517,447 B2 | 4/2009 | Gatlin | | 208/236 |
| 7,565,933 B2 | 7/2009 | Kippie et al. | | |
| 7,566,686 B2 | 7/2009 | Kippie et al. | | 507/213 |
| 7,712,535 B2 | 5/2010 | Venditto et al. | | |
| 7,723,273 B1 * | 5/2010 | Zaid et al. | | 507/219 |
| 7,767,628 B2 | 8/2010 | Kippie et al. | | 507/102 |
| 7,829,510 B2 | 11/2010 | Gatlin et al. | | |
| 7,886,824 B2 | 2/2011 | Kakadjian et al. | | |
| 7,915,203 B2 | 3/2011 | Falana et al. | | |
| 7,932,214 B2 | 4/2011 | Zamora et al. | | |
| 7,942,201 B2 | 5/2011 | Ekstrand et al. | | |
| 7,956,017 B2 | 6/2011 | Gatlin et al. | | |
| 7,956,217 B2 | 6/2011 | Falana et al. | | |
| 7,971,659 B2 | 7/2011 | Gatlin et al. | | 510/492 |
| 7,989,404 B2 | 8/2011 | Kakadjian et al. | | |
| 7,992,653 B2 | 8/2011 | Zamora et al. | | |
| 8,011,431 B2 | 9/2011 | van Petegem et al. | | |
| 8,012,913 B2 | 9/2011 | Gatlin et al. | | 507/239 |

(56) References Cited

U.S. PATENT DOCUMENTS

| | | | |
|---|---|---|---|
| 8,028,755 B2 | 10/2011 | Darnell et al. | |
| 8,034,750 B2 | 10/2011 | Thompson et al. | |
| 8,084,401 B2 | 12/2011 | Lukocs et al. | 507/238 |
| 8,093,431 B2 | 1/2012 | Falana et al. | |
| 8,097,567 B2 | 1/2012 | Wilson, Jr. | 507/131 |
| 8,141,661 B2 | 3/2012 | Kakadjian et al. | |
| 8,158,562 B2 | 4/2012 | Wilson, Jr. et al. | |
| 8,172,952 B2 | 5/2012 | Wanner et al. | |
| 8,220,546 B2 | 7/2012 | Kakadjian et al. | |
| 8,258,339 B2 | 9/2012 | Falana et al. | |
| 8,273,693 B2 | 9/2012 | Schwartz | |
| 8,287,640 B2 | 10/2012 | Zamora et al. | |
| 8,362,298 B2 | 1/2013 | Falana et al. | |
| 8,466,094 B2 | 6/2013 | Kakadjian et al. | |
| 8,475,585 B2 | 7/2013 | Zamora et al. | |
| 8,507,412 B2 | 8/2013 | Lukocs et al. | |
| 8,507,413 B2 | 8/2013 | Wilson, Jr. | |
| 8,524,639 B2 | 9/2013 | Falana et al. | |
| 8,530,394 B2 | 9/2013 | Gatlin | |
| 8,563,481 B2 | 10/2013 | Gatlin et al. | 507/203 |
| 8,714,283 B2 | 5/2014 | Gatlin et al. | |
| 8,728,989 B2 | 5/2014 | Kakadjian et al. | |
| 8,772,203 B2 | 7/2014 | Schwartz | |
| 8,835,364 B2 | 9/2014 | Thompson et al. | |
| 8,841,240 B2 | 9/2014 | Kakadjian et al. | |
| 8,846,585 B2 | 9/2014 | Falana et al. | |
| 8,851,174 B2 | 10/2014 | Zamora et al. | |
| 8,871,694 B2 | 10/2014 | Kakadjian et al. | |
| 8,899,328 B2 | 12/2014 | Zamora et al. | |
| 8,932,996 B2 | 1/2015 | Falana et al. | |
| 8,944,164 B2 | 2/2015 | Veldman et al. | |
| 8,946,130 B2 | 2/2015 | Zamora et al. | |
| 8,950,493 B2 | 2/2015 | van Petegem et al. | |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2004/0194961 A1* | 10/2004 | Nguyen | C09K 8/56 166/295 |
| 2005/0045330 A1* | 3/2005 | Nguyen | C09K 8/508 166/281 |
| 2005/0092489 A1 | 5/2005 | Welton et al. | 166/280.2 |
| 2005/0137114 A1 | 6/2005 | Gatlin et al. | 510/424 |
| 2009/0131280 A1* | 5/2009 | Federici et al. | 507/117 |
| 2010/0252262 A1 | 10/2010 | Ekstrand et al. | |
| 2010/0305010 A1 | 12/2010 | Falana et al. | |
| 2010/0311620 A1 | 12/2010 | Kakadjian et al. | |
| 2011/0001083 A1 | 1/2011 | Falana et al. | |
| 2011/0177982 A1 | 7/2011 | Ekstrand et al. | |
| 2011/0240131 A1 | 10/2011 | Parker | |
| 2012/0071367 A1 | 3/2012 | Falana et al. | |
| 2012/0073813 A1 | 3/2012 | Zamora et al. | |
| 2012/0097893 A1 | 4/2012 | Wanner et al. | |
| 2012/0273206 A1 | 11/2012 | Zamora et al. | |
| 2012/0279727 A1 | 11/2012 | Kakadjian et al. | |
| 2012/0295820 A1 | 11/2012 | Falana et al. | |
| 2012/0302468 A1 | 11/2012 | Falana et al. | |
| 2012/0325329 A1 | 12/2012 | Schwartz | |
| 2013/0081820 A1 | 4/2013 | Falana et al. | |
| 2013/0096038 A1 | 4/2013 | Kim et al. | |
| 2013/0175477 A1 | 7/2013 | Falana et al. | |
| 2013/0270012 A1 | 10/2013 | Kakadjian et al. | |
| 2013/0274151 A1 | 10/2013 | Kakadjian et al. | |
| 2013/0312977 A1 | 11/2013 | Lembcke et al. | |
| 2013/0331301 A1 | 12/2013 | Falana et al. | |
| 2014/0087977 A1 | 3/2014 | Kim et al. | |
| 2014/0128294 A1 | 5/2014 | Gatlin et al. | |
| 2014/0128308 A1 | 5/2014 | Levey et al. | |
| 2014/0166285 A1 | 6/2014 | Santra et al. | |
| 2014/0262287 A1 | 9/2014 | Treybig et al. | |
| 2014/0262319 A1 | 9/2014 | Treybig et al. | |
| 2014/0303048 A1 | 10/2014 | Kakadjian et al. | |
| 2014/0315763 A1 | 10/2014 | Kakadjian et al. | |
| 2014/0318793 A1 | 10/2014 | van Petergem et al. | |
| 2014/0318795 A1 | 10/2014 | Thompson, Sr. et al. | |
| 2014/0323360 A1 | 10/2014 | Comarin et al. | |
| 2014/0323362 A1 | 10/2014 | Falana et al. | |
| 2015/0007989 A1 | 1/2015 | Tan et al. | |
| 2015/0011440 A1 | 1/2015 | Zamora et al. | |
| 2015/0051311 A1 | 2/2015 | Zamora et al. | |
| 2015/0068747 A1 | 3/2015 | Hwang et al. | |
| 2015/0072901 A1 | 3/2015 | Samuel et al. | |
| 2015/0087561 A1 | 3/2015 | Falana et al. | |
| 2015/0087562 A1 | 3/2015 | Falana et al. | |

FOREIGN PATENT DOCUMENTS

| | | | |
|---|---|---|---|
| GB | 775376 | 10/1954 | |
| GB | 1073338 A | 6/1967 | |
| JP | 8151422 | 6/1996 | |
| JP | 100001461 | 1/1998 | |
| JP | 10110115 | 4/1998 | |
| JP | 2005194148 | 7/2005 | |
| WO | WO 98/56497 | 12/1998 | |
| WO | WO 2009141308 | 11/2009 | C09K 8/528 |

* cited by examiner

RESIN SEALANT FOR ZONAL ISOLATION AND METHODS FOR MAKING AND USING SAME

RELATED APPLICATIONS

The present invention is a continuation of, claims priority to and the benefit of U.S. patent application Ser. No. 12/784,479 filed 20 May 2010 (May 20, 2010) (20 May 2010) now U.S. Pat. No. 8,899,328 issued 2 Dec. 2014 (Dec. 02, 2014).

BACKGROUND OF THE INVENTION

1. Field of the Invention

Embodiments of the present invention relate to methods and systems for zonal isolation, where a zone isolation composition is pumped into an annulus between a borehole and a tubular member allowed to set to form an isolation seal, where the seal has a compressibility sufficient for expandable tubing to be expanded without loss in seal integrity. The cured compositions are ideally suited for use with expansion tubing, where the zonal isolation composition must be compressible, while continuing to isolate the zones.

More particularly, embodiments of the present invention relate to methods and systems for zonal isolation, where the zone isolation composition is pumped into an annulus between a borehole and a tubular member allowed to test to form an isolation seal, where the seal has a compressibility sufficient for expandable tubing to be expanded without loss in seal integrity. The composition includes epoxy resins and hardening agents in the presence or absence of a solvent or solubilizing agent. The invention contemplates different combination of the resins, hardening agents and solubilizing agents for different temperature application: a low temperature zonal isolation composition, a moderate temperature isolation composition and a high temperature isolation composition, where the low temperature composition sets at a low temperature range, the moderate temperature composition set at a moderate temperature range and the high temperature composition sets at a high temperature range. All of the compositions cure to form a compressible zonal isolation epoxy seal capable of use with expansion tubing.

2. Description of the Related Art

Conventional sealants for zonal isolation are cements, foam fluids or resins. In expandable tubing applications, the zonal isolation sealant must be able to compress and to continue to seal after the sealant is pumped behind the pipe and set. Conventional zone isolation systems do not offer the compressibility and/or resilience necessary to permit expandable pipe to expand without fracturing the system due to their hardness obviating zonal isolation. Expandable pipe must, therefore, be expanded prior to the sealant setting. This requires retarding the setting of the sealant for a time sufficient to permit the expandable pipe to be expanded prior to sealant setting. Once the tubing is expanded, the sealant sets. Problems arise when expansion of expandable tubing cannot occur within the retarding window for once the sealant sets, the expandable tubing cannot be expanded due the incompressibility of the cured sealant.

Thus, there is a need in the art for a sealant that is compressible and/or resilient permitting expandable tubing to be expanded before, during and/or after sealant curing. The solution to these problems is a sealant that is compressible or resilient enough to allow expansion of the expandable pipe before, during or after the material has harden.

SUMMARY OF THE INVENTION

Embodiments of the present invention provide an epoxy zonal isolation composition including one epoxy resin or a plurality of epoxy resins and one hardening agent or a plurality of hardening agents in the present or absence of a diluent or solvent, where the composition cures to form a cured epoxy zonal isolation composition having sufficient compressibility and/or resilience properties to permit compression of the composition without substantial loss in seal integrity or zonal isolation. In certain embodiments, the compressibility is sufficient to allow expansion of expansion tubing pipe during or especially after hardening or curing of the composition. The sealant compositions are designed to have sufficient strength and bonding characteristics so that the liner, expandable tubing or other tubing inserted into the borehole is held in place in the borehole and the borehole is sealed so that there is no migration of fluids from one zone to another zone. The term substantial loss of seal integrity means that the seal integrity after compression with is at least 75% of the seal integrity before compression. In other embodiments, the term means that the seal integrity after compression with is at least 85% of the seal integrity before compression. In other embodiments, the term means that the seal integrity after compression with is at least 90% of the seal integrity before compression. In other embodiments, the term means that the seal integrity after compression with is at least 95% of the seal integrity before compression.

Embodiments of the present invention provide an epoxy resin system having desired mechanical properties that allow the epoxy resin system to have improved compressibility and/or resiliency properties.

Embodiments of the present invention provide a resilient sealant composition for use as a squeeze material to shut off annular gas migration and/or zonal isolation during primary casing or liner top isolation. The sealant composition is unique because the mechanical properties are set to allow the composition to be ductile and offer long term isolation.

Embodiments of the present invention provide methods for zonal isolation including inserting a tubing into a borehole. After tubing placement, pumping a composition of this invention into an annulus between the wall of the borehole and an outer wall of the tubing. Allowing sufficient time for the composition to cure sealing the annulus. The composition can be pumped in two parts, the resins and the hardening agents are pumped separately downhole and mixed in a static mixing chamber downhole prior to being pumped into the annulus. In the case of expansion tubing, the methods may also include expanding the tubing, where the expansion of the tubing results in a compression of the composition, where the composition maintain isolation after expansion.

Embodiments of the present invention provide methods for squeeze operations including pumping the composition into annulus or a region, where fluid (gas, liquid, or mixture thereof) migration is occurring to form a seal to reduce or eliminate such migration. The methods may also include isolating the region so that the composition locally reduces or prevents fluid (gas, liquid, or mixture thereof) migration. The methods may also include maintaining isolation until the composition is fully cured.

Embodiments of the present invention provide a method for zone isolation including pumping an epoxy-based composition in an annulus between a borehole and a tubing string. The composition is then allowed to cure to form a zonal isolation structure comprising the cured composition. The cured composition is compressible and cures at a temperature range between about 50° and about 300° F. The method may also include prior to pumping, isolating a section of an annulus between the borehole and the tubing string so that the zonal isolation structure is located along a length of the tubing string. The method may also include during or after curing, expanding a section of the tubing string, where the compressibility of the cured is sufficient to allow expansion of tubing without substantial loss in seal integrity or zonal isolation. The zonal isolation structure is locate at a distal end of the borehole. The composition comprises one epoxy resin or a plurality of epoxy resins and one hardening agent or a plurality of hardening agents in the present or absence of a diluent or solvent, where the composition cures to form a cured epoxy composition having sufficient compressibility and/or resilience properties to permit compression of the composition without substantial loss in seal integrity or zonal isolation. The diluents comprise aromatic solvents and heterocyclic aromatic solvents or mixtures and combinations thereof. The epoxy resins may comprise a) glycidyl ethers epoxy resin prepared by the reaction of epichlorohydrin with a compound containing a hydroxyl group carried out under alkaline reaction conditions; (b) epoxy resins prepared by the reaction of epichlorohydrin with mononuclear di- and tri-hydroxy phenolic compounds; (c) epoxidized derivatives of natural oils with mixed long-chain saturated and unsaturated acids having between about 14 and 20 carbon atoms; (d) polyepoxides derived from esters of polycarboxylic acids with unsaturated alcohols; (e) polyepoxides derived from esters prepared from unsaturated alcohols and unsaturated carboxylic acids; (f) epoxidized butadiene based polymers; (g) epoxidized derivatives of dimers of dienes, and (h) mixtures or combinations thereof. The epoxy resins may have a molecular weight between about 50 and about 10,000. The curing agents may comprise polyamine curing agents, alkoxylated polyamine curing agents, heterocylic amine curing agents, or similar compounds including a plurality of amino groups, or mixtures and combinations thereof. The curing agents may comprise alkoxylated aliphatic polyamines, alkoxylated cycloaliphatic polyamines, alkoxylated aromatic polyamines, alkoxylated heterocyclic polyamines or mixtures and combinations thereof. The curing agents may comprise alkoxylated N-alkyl- and N-alkylenyl-substituted 1,3-diaminopropanes or mixtures and combinations thereof. The aromatic heterocyclic amine curing agents may comprise pyrrolidine, alkyl pyrrolidines, oxazoline, alkyl oxazolines, triazoles, alkyl triazoles, pyrazolidine, alkyl pyrazolidine, piperidine, alkyl piperidines, piperazine, alkyl piperazines, imidazoline, imidazolidine, alkyl imidazolidines, azepane, alkyl azepane, azepine, alkyl azepines, morpholine, alkyl morpholines, diazapines, alkyl diazapines, or mixtures and combinations thereof. The curing agents comprise alkyl pyridines and DURA COAT 2B™ available from JACAM Chemicals, LLC, of Sterling, KS.

In certain embodiments, the temperature range is between about 150° F. to about 300° F. and the composition comprises from about 60 wt. % to about 85 wt. % of an epoxy resin or mixture of epoxy resins, from about 1 wt. % to about 15 wt. % of a curing agents, and from about 39 wt. % to about 0 wt. % of a diluent or solvent, where the diluent or solvent is used to reduce the viscosity of the composition. The epoxy resins are glycidyl ethers epoxy resins or mixture of glycidyl ethers epoxy resins, the curing agent is an alkoxylated polyamine or mixture of alkoxylated polyamines and the diluent is an aromatic heterocyclic solvent or mixture of aromatic heterocyclic solvents. The epoxy resin is DURA COAT 1A™ available from JACAM Chemicals, LLC, of Sterling, KS, the curing agent is DURA COAT 2B™ available from JACAM Chemicals, LLC, of Sterling, KS and the diluent is AKOLIDINE™ 11 available from Lonza Group Ltd, Joseph Colleluori, Muenchensteinerstrasse 38, CH-4002 Basel, Switzerland.

In certain embodiments the temperature range is between about 90° F. and about 150° F. and the composition comprises from about 70 wt. % to about 50 wt. % of an epoxy resin or mixture of epoxy resins and from about 30 wt. % to about 50 wt. % of a curing agents. The epoxy resins may be glycidyl ethers epoxy resin or mixture of glycidyl ethers epoxy resins and the curing agent may be a heterocyclic amine. The epoxy resin may be DURA COAT 1A™ available from JACAM Chemicals, LLC, of Sterling, KS and the curing agent may be a imidazoline or mixture or imidazolines.

In certain embodiments the temperature range is between about 50° F. and about 90° F. and the composition comprises from about 75 wt. % to about 99 wt. % of an epoxy resin or mixture of epoxy resins and from about 25 wt. % to about 1 wt. % of a curing agents. The epoxy resins may be glycidyl ethers epoxy resin or mixture of glycidyl ethers epoxy resins and the curing agent is a imidazoline, pyrrolidine, pyrrole, pyridine, piperidine or mixtures thereof. The epoxy resin may be DURA COAT 1A™ available from JACAM Chemicals, LLC, of Sterling, KS and the curing agent may be a imidazoline, pyrrolidine, pyrrole, pyridine, piperidine or mixtures thereof.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

The inventors have found that a thermal setting epoxy based resin system can be used as a zone isolation sealant in downhole zone isolation operations. The epoxy based resin system cures to form a zonal isolation composition having a compressibility sufficient for use in expansion tubing applications, where the composition compresses during tubing expansion without substantial loss in seal integrity, where the term substantial means that the seal integrity after expansion is at least 80% of the seal integrity prior to expansion and after setting. In other embodiments, the seal integrity after expansion is at least 85% of the seal integrity prior to expansion and after setting. In other embodiments, the seal integrity after expansion is at least 90% of the seal integrity prior to expansion and after setting. In other embodiments, the seal integrity after expansion is at least 95% of the seal integrity prior to expansion and after setting. The inventors have also found that the composition may be pumped into an annulus between the wellbore and the expansion tubing, and the tubing expanded while the composition is curing. The compositions of this invention are designed to cure after the composition has been pumped into a zone, where isolation is required or desired. In certain embodiments, the hardening agents have delayed cure onset. In other embodiments, the hardening agent are added to the resins downhole, just prior to the composition being pumped into the zone. In these latter embodiments, the resin and hardening agents may pass through a static mixer, mechanical mixer, electromechanical mixer or other type of mixer to insure adequate dispersal of the hardening agent in the resin.

Embodiments of the present invention broadly relate to an epoxy-based zonal isolation composition including one epoxy resin or a plurality of epoxy resins and one hardening agent or a plurality of hardening agents in the present or absence of a diluent or solvent. The composition cures to form a cured epoxy-based zonal isolation composition having sufficient compressibility and/or resilience properties to permit compression of the composition without substantial loss in seal integrity or zonal isolation. In certain embodiments, the compressibility is sufficient to allow expansion of expansion tubing pipe during or especially after hardening or curing of the composition. The sealant compositions are designed to have sufficient strength and bonding characteristics so that the liner, expandable tubing or other tubing inserted into the borehole is held in place in the borehole and the borehole is sealed so that there is no migration of fluids from one zone to another zone.

Embodiments of the present invention specifically relate to high-temperature epoxy-based zonal isolation compositions including one epoxy resin or a plurality of epoxy resins and one hardening agent or a plurality of hardening agents in the present or absence of a diluent or solvent. The composition is designed to thermally set at temperature between about 150° F. to about 300° F. In certain embodiments, the high-temperature zonal isolation composition includes from about 60 wt. % to about 85 wt. % of an epoxy resin or mixture of epoxy resins, from about 1 wt. % to about 15 wt. % of a curing agents, and from about 39 wt. % to about 0 wt. % of a diluent or solvent. The diluent or solvent is used to reduce the viscosity of the composition. In other embodiments, the high-temperature zonal isolation composition includes from about 65 wt. % to about 85 wt. % of an epoxy resin or mixture of epoxy resins, from about 5 wt. % to about 10 wt. % of a curing agents, and from about 30 wt. % to about 5 wt. % of a diluent or solvent. In other embodiments, the high-temperature zonal isolation composition includes from about 75 wt. % to about 85 wt. % of an epoxy resin or mixture of epoxy resins, from about 5 wt. % to about 10 wt. % of a curing agents, and from about 20 wt. % to about 5 wt. % of a diluent or solvent. In other embodiments, the high-temperature zonal isolation composition includes from about 80 wt. % to about 85 wt. % of an epoxy resin or mixture of epoxy resins, from about 5 wt. % to about 10 wt. % of a curing agents, and from about 15 wt. % to about 5 wt. % of a diluent or solvent. In certain embodiments, the epoxy resin is a glycidyl ethers epoxy resin or mixture of glycidyl ethers epoxy resins, the curing agent is an alkoxylated polyamine or mixture of alkoxylated polyamines and the diluent is an aromatic heterocyclic solvent or mixture of aromatic heterocyclic solvents. In other embodiments, the epoxy resin is DURA COAT 1A™ available from JACAM Chemicals, LLC, of Sterling, KS, the curing agent is DURA COAT 2B™ available from JACAM Chemicals, LLC, of Sterling, KS and the diluent is AKOLIDINE™ 11 available from Lonza Group Ltd, Joseph Colleluori, Muenchensteinerstrasse 38, CH-4002 Basel, Switzerland.

Embodiments of the present invention specifically relate to mid-temperature epoxy-based zonal isolation compositions including one epoxy resin or a plurality of epoxy resins and one hardening agent or a plurality of hardening agents in the present or absence of a diluent or solvent. The composition is designed to thermally set at temperature between about 90° F. and about 150° F. In certain embodiments, the mid-temperature zonal isolation composition includes from about 70 wt. % to about 50 wt. % of an epoxy resin or mixture of epoxy resins and from about 30 wt. % to about 50 wt. % of a curing agents. In other embodiments, the mid-temperature zonal isolation composition includes from about 60 wt. % to about 50 wt. % of an epoxy resin or mixture of epoxy resins and from about 40 wt. % to about 50 wt. % of a curing agents. In other embodiments, the mid-temperature zonal isolation composition includes from about 55 wt. % to about 50 wt. % of an epoxy resin or mixture of epoxy resins and from about 45 wt. % to about 50 wt. % of a curing agents. The mid-temperature zonal isolation compositions may be diluted with up to about 20 wt. % of a diluent or solvent, where the diluent or solvent is used to reduce the viscosity of the composition. In other embodiments, the epoxy resin is glycidyl ethers epoxy resin or mixture of glycidyl ethers epoxy resins and the curing agent is a heterocyclic amine. In certain embodiments, the epoxy resin is DURA COAT 1A™ available from JACAM Chemicals, LLC, of Sterling, KS, and the curing agent is a imidazoline or mixture or imidazolines.

Embodiments of the present invention specifically relate to low-temperature epoxy-based zonal isolation compositions including one epoxy resin or a plurality of epoxy resins and one hardening agent or a plurality of hardening agents in the present or absence of a diluent or solvent. The composition is designed to thermally set at temperature between about 50° F. and about 90° F. In certain embodiments, the low-temperature zonal isolation composition includes from about 75 wt. % to about 99 wt. % of an epoxy resin or mixture of epoxy resins and from about 25 wt. % to about 1 wt. % of a curing agents. In other embodiments, the low-temperature zonal isolation composition includes from about 85 wt. % to about 97.5 wt. % of an epoxy resin or mixture of epoxy resins and from about 15 wt. % to about 2.5 wt. % of a curing agents. In other embodiments, the low-temperature zonal isolation composition includes from about 90 wt. % to about 95 wt. % of an epoxy resin or mixture of epoxy resins and from about 10 wt. % to about 5 wt. % of a curing agents. The low-temperature zonal isolation compositions may be diluted with up to about 20 wt. % of a diluent or solvent, where the diluent or solvent is used to reduce the viscosity of the composition. In other embodiments, the epoxy resin is glycidyl ethers epoxy resin or mixture of glycidyl ethers epoxy resins and the curing agent is a heterocyclic amine. In certain embodiments, the epoxy resin is DURA COAT 1A™ available from JACAM Chemicals, LLC, of Sterling, KS, and the curing agent is a imidazoline, pyrrolidine, pyrrole, pyridine, piperidine or mixtures thereof.

Embodiments of the present invention also broadly relates to methods for zonal isolation including inserting a tubing into a borehole. After tubing placement, pumping a composition of this invention into an annulus between the wall of the borehole and an outer wall of the tubing. The method also includes allowing sufficient time for the composition to cure sealing the annulus. The composition can be pumped in two parts, the resins and the hardening agents are pumped separately downhole and mixed in a static mixing chamber downhole prior to being pumped into the annulus.

Embodiments of the present invention also provide methods for squeeze operations including pumping the composition into annular spaces, regions or locations in a complete well, where gas or oil migration is occurring to form a seal to reduce or eliminate such migration.

Suitable Materials for Use in the Invention

Suitable epoxy resin include, without limitation, (a) glycidyl ethers epoxy resin prepared by the reaction of epichlorohydrin with a compound containing a hydroxyl group (e.g., bisphenol A) carried out under alkaline reaction conditions; (b) epoxy resins prepared by the reaction of epichlorohydrin with mononuclear di- and tri-hydroxy phenolic compounds such as resorcinol and phloroglucinol, selected polynuclear polyhydroxy phenolic compounds such as bis (p-hydroxyphenyl)methane and 4,4'-dihydroxy biphenyl, or aliphatic polyols such as 1,4-butanediol and glycerol; (c) epoxidized derivatives of natural oils such as the triesters of glycerol with mixed long-chain saturated and unsaturated acids having between about 14 and 20 carbon atoms (e.g., 16, 18 and 20 carbon atoms) (soybean oil is a typical triglyceride which can be converted to a polyepoxide); (d) polyepoxides derived from esters of polycarboxylic acids such as maleic acid, terephthalic acid, oxalic acid, succinic acid, azelaic acid, malonic acid, tartaric acid, adipic acid or similar acids, with unsaturated alcohols; (e) polyepoxides derived from esters prepared from unsaturated alcohols and unsaturated carboxylic acids; (f) epoxidized butadiene based polymers such as butadiene-styrene copolymers, polyesters available as derivatives of polyols such as ethylene glycol with unsaturated acid anhydrides such as maleic anhydride and esters of unsaturated polycarboxylic acids; (g) epoxidized derivatives of dimers of dienes such as 4-vinyl cyclohexene-1 from butadiene and dicyclopentadiene from cyclopentadiene, and (h) mixtures or combinations thereof. Epoxy resins suitable for use in the invention have molecular weights generally within the range between about 50 and about 10,000. In other embodiments, the range is between about 2000 and about 1500. In other embodiments, the epoxy resin is commercially available Epon 828 epoxy resin, a reaction product of epichlorohydrin and 2,2-bis(4-hydroxyphenyl)propane (bisphenol A) and having a molecular weight of about 400, an epoxide equivalent (ASTM D-1652) of about 185-192. Exemplary examples of some epoxy resins include, without limitation: epoxidized esters of 2,3-epoxypentyl-3,4-epoxybutyrate; 2,3-epoxybutyl-3,4-epoxyhexanoate; 3,4-epoxyoctyl-2,3-epoxycyclohexane carboxylate; 2,3-epoxydodecyl-4,5-epoxyoctanoate; 2,3-epoxyisobutyl-4,5-epoxydodecanoate; 2,3-epoxycyclododedcyl-3,4-epoxypentanoate; 3,4-epoxyoctyl-2,3-epoxycyclododecane carboxylate or similar compounds; and polyepoxides derived from the latter include the following: dimethyl 3,4,7,8-diepoxydecanedioate; dibutyl 3,4,5,6-diepoxycyclohexane-1,2-carboxylate; dioctyl 3,4,7,8-diepoxyhexadecanedioate; diethyl 5,6,9,10-diepoxytetradecanedioate or similar anhydrides. In other embodiments the epoxy resin is DURA COAT 1A™ available from JACAM Chemicals, LLC, of Sterling, KS. Other epoxy resins are available from JACAM Chemicals, LLC, of Sterling, KS or maybe found in U.S. Pat. Nos. 5,936,059; 7,557,169; 7,547,373; 7,267,782; 6,943,219; and 6,277,903.

Suitable curing agents for the epoxy resins include, without limitation, polyamine curing agents, alkoxylated polyamine curing agents, heterocylic amine curing agents, or similar compounds including a plurality of amino groups, or mixtures and combinations thereof. Exemplary alkoxylated polyamine curing agents include, without limitation, alkoxylated aliphatic polyamines, alkoxylated cycloaliphatic polyamines, alkoxylated aromatic polyamines, alkoxylated heterocyclic polyamines or mixtures and combinations thereof. In certain embodiments, the alkoxylated polyamines are alkoxylated N-alkyl- and N-alkylenyl-substituted 1,3-diaminopropanes or mixtures and combinations thereof. In other embodiments, the alkoxylated polyamines include alkoxylated N-hexadecyl-1,3-diaminopropane, N-tetradecyl-1,3-diaminopropane, N-octadecyl-1,3-diaminopropane, N-pentadecyl-1,3-diaminopropane, N-heptadecyl-1,3-diaminopropane, N-nonadecyl-1,3-diaminopropane, N-octadecynyl-1,3-diaminopropane or mixtures and combinations thereof. In other embodiments, the alkoxylated polyamines include commercially available mixtures of ethoxylated N-alkylated and N-alkenylated diamines. In other embodiments, the polyamine is a commercial product, ethoxylated N-tallow-1,3-diaminopropane, where the degree of ethoxylation is approximately 10 moles ethoxylate per mole of tallow diamine. In other embodiments the epoxy curing agent is DURA COAT 2B™ available from JACAM Chemicals, LLC, of Sterling, KS. Other epoxy curing agents are available from JACAM Chemicals, LLC, of Sterling, KS or may be found in U.S. Pat. Nos. 5,936,059; 7,557,169;

7,547,373; 7,267,782; 6,943,219; and 6,277,903. Exemplary aromatic heterocyclic amine curing agents include, without limitation, pyrrolidine, alkyl pyrrolidines, oxazoline, alkyl oxazolines, triazoles, alkyl triazoles, pyrazolidine, alkyl pyrazolidines, piperidine, alkyl piperidines, piperazine, alkyl piperazines, imidazoline, imidazolidine, alkyl imidazolidines, azepane, alkyl azepane, azepine, alkyl azepines, morpholine, alkyl morpholines, diazapines, alkyl diazapines, or mixtures and combinations thereof. In certain embodiments, the curing agents are a mixture of alkyl pyridines such as AKOLIDINE™ 11, available from Lonza Group Ltd, Joseph Colleluori, Muenchensteinerstrasse 38, CH-4002 Basel, Switzerland and DURA COAT 2B™ available from JACAM Chemicals, LLC, of Sterling, KS. In other embodiments, the diluent is pyrrolidine. In other embodiments, the diluent is imodazoline.

Suitable diluents or solvents for use in the present invention include, without limitation, aromatic solvents and heterocyclic aromatic solvents or mixtures and combinations thereof. Exemplary examples include, without limitation, benzene, toluene, xylene, aromatic oils, aromatic naphtha, pyrrole, alkyl pyrrols, imidazole, alkyl imidazole, pyridine, alkyl pyridines, pyrazole, alkyl pyrazoles, oxazole, alkyl oxazoles, or mixtures and combinations thereof.

DETAILED DESCRIPTION OF THE DRAWINGS

Referring now to FIGS. 1A-D, an embodiment of a zonal isolation procedure of this invention, generally 100, is shown to include well borehole 102 having a wall 104. Inserted into the borehole 102 is a casing string 106, which has a distal end 108 disposed near a bottom 110 of the well 102. Looking at FIG. 1B, a supply conduit 112 including a packer 114 is inserted into the borehole 102 and an epoxy-based zonal isolation composition 116 of this invention is pumped into the borehole 102 through the conduit 112 and into an annular space 118 between the wall 104 of the borehole 102 and an outer wall 120 of the casing 106. Looking at FIG. 1C, pumping is continued until the composition 116 fills the annular space 118 to a desired level 122 in the borehole 102 and the conduit 112 and packer 114 are removed (shown after equipment removal). Looking at FIG. 1D, the composition 116 cures to form a cured, epoxy-based zone isolation structure 124.

Referring now to FIGS. 2A-D, another embodiment of a zonal isolation procedure of this invention, generally 200, is shown to include well borehole section 202 having a wall 204 and including a casing string 206 extending through the section 202. Looking at FIG. 2B, the section 202 is shown equipped with a bottom zone isolation sealing member 208, outlets 210, and a supply conduit 212 including packers 214. An epoxy-based zonal isolation composition 216 of this invention is then pumped through the conduit 212 into an annular space 218 between the wall 204 of the section 202 above the member 208. Looking at FIG. 2C, pumping is continued until the composition 216 fills the annular space 218 to a desired level 220 in the section 202. The conduit 212 and packers 214 are then removed (shown after equipment removal). Looking at FIG. 2D, the composition 216 cures to form a cured, epoxy-based zone isolation structure 222 within the section 202.

Figure 1A:
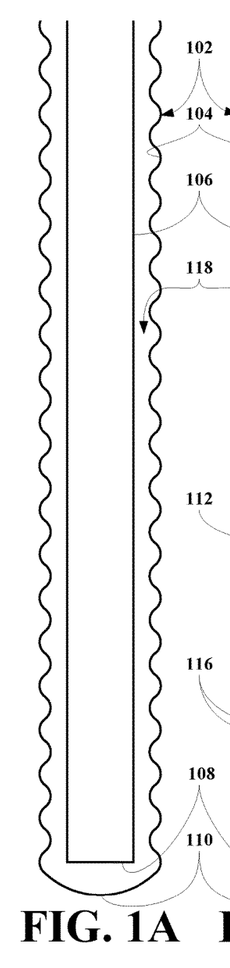
FIG. 1A depicts an annulus between a borehole and a tubing inserted into the borehole.
Figure 1B:
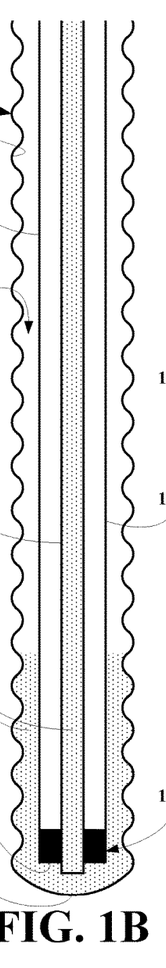
FIG. 1B depicts the annulus of FIG. 1A having an sealant supply conduit inserted into the borehole with a packer to prevent the sealant from filling the casing showing the annulus being filled with an epoxy zonal isolation or sealant composition of this invention.
Figure 1C:
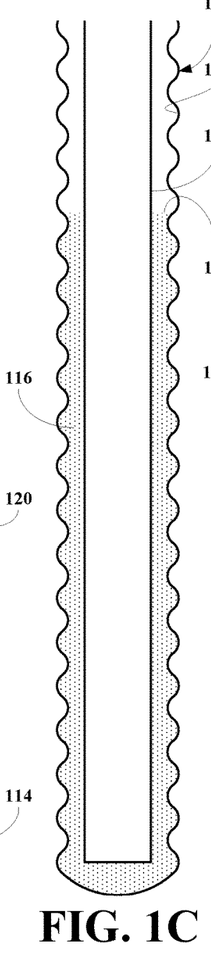
FIG. 1C depicts the annulus of FIG. 1A after a zone of the borehole has been filled with the epoxy zonal isolation composition.
Figure 1D:
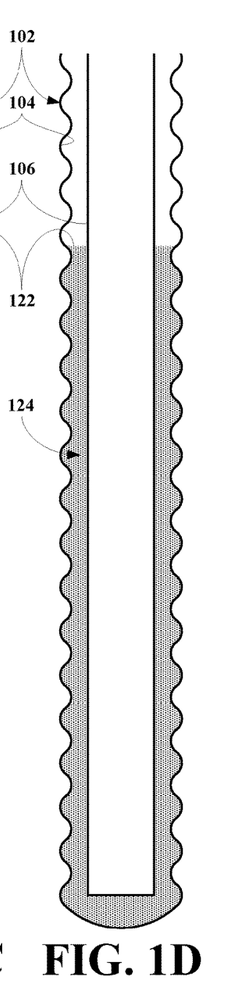
FIG. 1D depicts the zone of the annulus of FIG. 1A filled with a compressible, cured epoxy zonal isolation composition after curing.
Figure 2A:
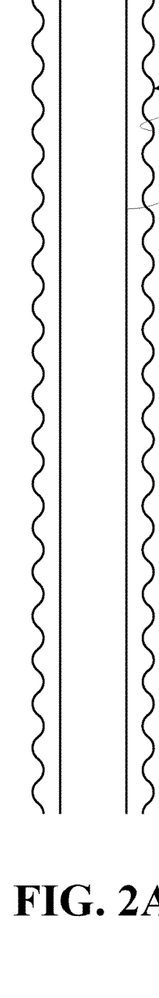
FIG. 2A depicts an annulus between a borehole and a tubing inserted into the borehole.
Figures 2B, 2C:
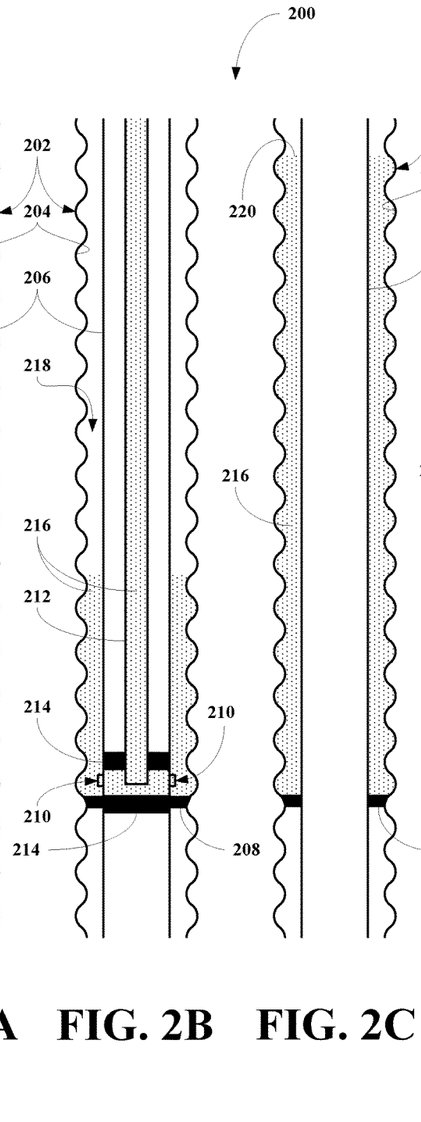
FIG. 2B depicts the annulus of FIG. 2A having an sealant supply conduit inserted into the borehole with packers and an isolation member to isolate a section of the annulus showing the section being filled with an epoxy zonal isolation or sealant composition of this invention.
FIG. 2C depicts the annulus of FIG. 2A after the section has been filled with the epoxy zonal isolation composition.
Figure 2D:
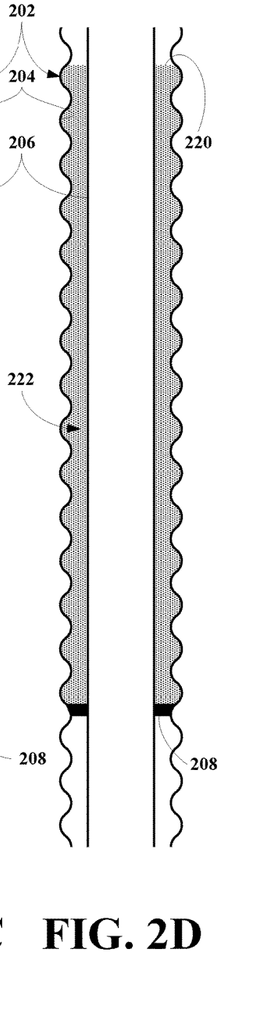
FIG. 2D depicts the zone of the annulus of FIG. 2A filled with a compressible, cured epoxy zonal isolation composition after curing.
Figures 3A, 3B, 3C:
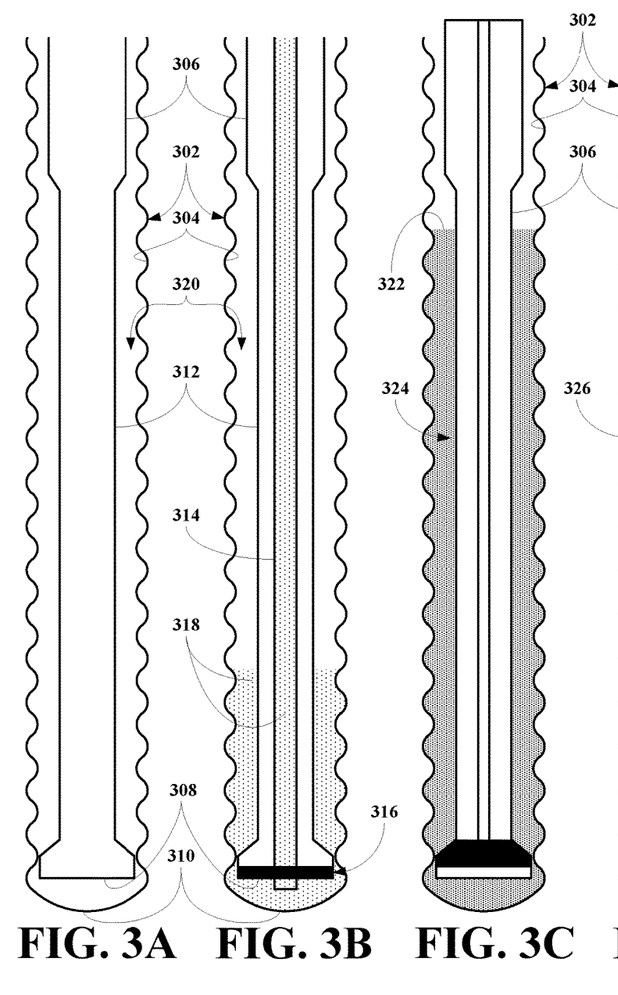
FIG. 3A depicts an annulus between a borehole and an expandable tubing, where the annulus is being filled with an epoxy zonal isolation composition of this invention.
FIG. 3B depicts the annulus of FIG. 3A being filled with the epoxy zonal isolation composition.
FIG. 3C depicts the annulus of FIG. 3A after curing of the epoxy zonal isolation composition in the annulus and inserting of an expansion member at the end of the casing.
Figure 3D:
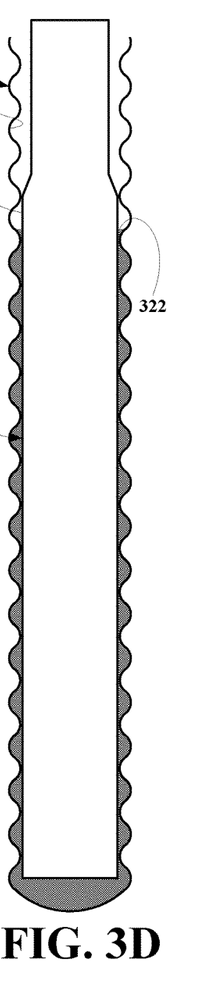
FIG. 3D depicts the zone of the annulus of FIG. 3A after expansion of the casing.
Figure 4A:
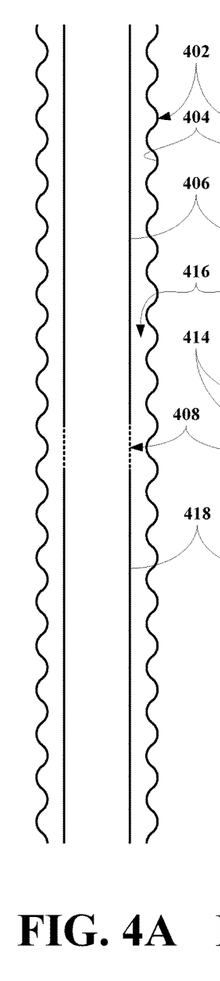
FIG. 4A depicts a borehole including a region through which fluid flow into and out of the casing.
Figure 4B:
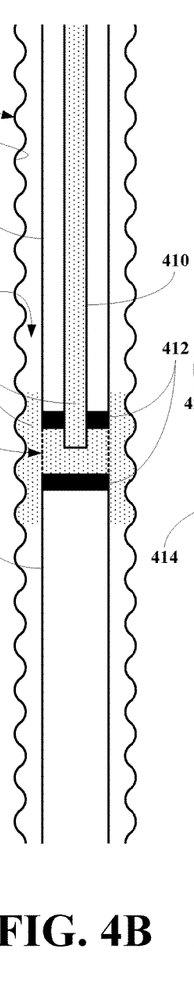
FIG. 4B depicts the annulus of FIG. 4A after isolating the region and filling the annulus around the region with the epoxy zone isolation composition.
Figure 4C:
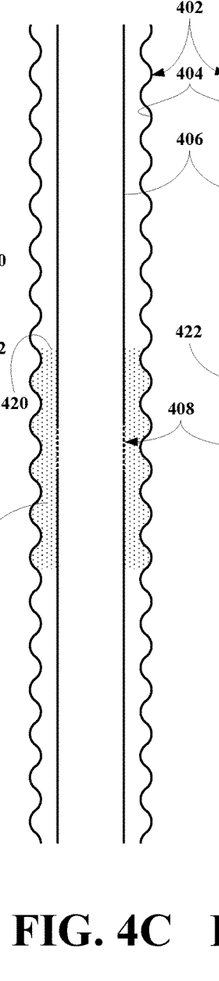
FIG. 4C depicts the annulus of FIG. 4A after the annulus region has been filled with the epoxy zonal isolation composition.
Figure 4D:
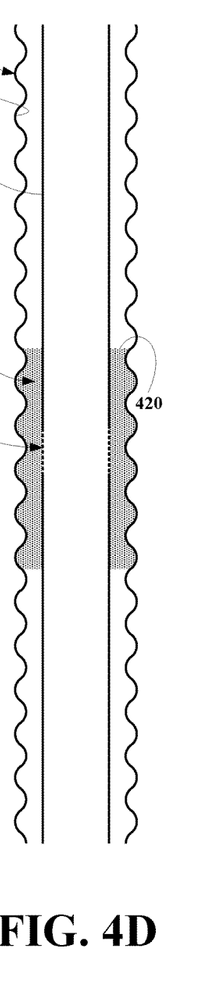
FIG. 4D depicts the zone of the annulus of FIG. 4A filled with a compressible, cured epoxy zonal isolation composition after curing.

Referring now to FIGS. 3A-D, an embodiment of an expansion tubing procedure of this invention, generally 300, is shown to include well borehole 302 having a wall 304 and including a casing string 306 extending through the borehole 302, where the casing 306 has a distal end 308 disposed near a bottom 310 of the borehole 302. The casing 306 also includes an expandable section 312. Looking at FIG. 3B, the borehole 302 is shown equipped with a supply conduit 314 including a packer 316. An epoxy-based zonal isolation composition 318 of this invention is then pumped through the conduit 314 into an annular space 320 between the wall 304 of the borehole 302. Pumping is continued until the composition 318 fills the annular space 320 to a desired level 322 in the borehole 302. The conduit 314 and packer 316 are then removed (not shown) and the composition 318 allowed to cure to form a cured, epoxy-based zone isolation structure 324 within the borehole 302. An expansion member 326 is then inserted into the casing 306 and the tubing is expanded by pulling the expansion member 326 through the expansion section 312 of the casing 306 to expand the expansion section 312 as shown in FIG. 3C. The expansion operation results in a compression of the cured, epoxy-based zone isolation structure 324 to form a compressed, cured, epoxy-based zone isolation structure 328 as shown in FIG. 3D. Additional details on expansion tubing, how it is expanded and used in downhole applications may be found in, published Apr. 1, 2010 and U.S. Pat. Nos. 3,049,752, 3,678,560, 3,905,227, 4,204,426, 4,616,987, 5,271,469, 5,271,472, 5,947,213, 6,112,809, 6,296,057, 6,843,317, 6,880,632, 7,182,141, 7,215,125, 7,500,389, 7,634,942, and United States Published Application No. 20030111234, 20040099424, 20040154797, 20040163819, 20040216925, 20050173109, 20050173130, 20050279514, 20050279515, 20060027376, 20070151360, 20080083533 and 20100078166.

Referring now to FIGS. 4A-D, an embodiment of a squeeze out procedure of this invention, generally 400, is shown to include well borehole section 402 having a wall 404 and including a casing string 406 extending through the section 402. The section 402 includes a region 408 through which fluid flow into and out of the casing 406. This region 408 may result in contamination of production fluids, treating fluids, or other fluids typically used in downhole operations. To reduce or eliminate the flow of fluid through the region 408, a sealant of this invention can be pumped into the region 408, and after curing, the sealant will form a seal reducing or eliminating fluid flow into and out of the casing 406. Looking at FIG. 4B, the section 402 is shown equipped with a supply conduit 410 including packers 412. An epoxy-based zonal isolation composition 414 of this invention is then pumped through the conduit 410 into an annular space 416 between the wall 404 of the section 402 and an outer wall 418 of the casing 406. Looking at FIG. 4C, pumping is continued until the composition fills the annular space 416 to a desired level 420 in the section 402. The conduit 410 and packers 412 are then removed (shown after equipment removal). Looking at FIG. 4D, the composition 414 cures to form a cured, epoxy-based zone isolation structure 422 within the section 402 reducing or eliminating flow through the case 406 at the region 408.

EXPERIMENTS OF THE INVENTION

Example 1

This example illustrates the formulation of an epoxy zonal isolation composition for high temperature applications, where the composition has a set temperature in a high-temperature range between about 150° F. to about 300° F.

22.6 grams of DURA COAT 1A™ available from JACAM Chemicals, LLC, of Sterling, KS was added to 2.6 grams of Akolidine 11 with mixing. To this solution was added 2.0 grams of DURA COAT 2B™ available from JACAM Chemicals, LLC, of Sterling, KS to form a high-temperature zonal isolation composition (HTZIC) of this invention. Table I tabulates the components, the amount and weight percentages of the HTZI composition of this invention, while Table II tabulates properties of the components.

TABLE I

High-Temperature Zone Isolation Composition

| Component | Weight (g) | Percent (w/w) |
|---|---|---|
| DURA COAT 1A ™ | 22.6 | 83.1 |
| DURA COAT 2B ™ | 2.0 | 7.3 |
| AKOLIDINE ™ 11 | 2.6 | 9.6 |
| Total | 27.2 | 100 |

TABLE II

Properties of the Components and HTZIC

| Component | Color | pH | r @ 25° C. (g/cm$^3$) | SG @ 25° C. |
|---|---|---|---|---|
| DURA COAT 1A ™ | Colorless | 9.02 | 1.16094 | 1.16473 |
| DURA COAT 2B ™ | Brown | 10.92 | 0.93827 | 0.94105 |
| AKOLIDINE ™ 11 | Dark Brown | 3.14 | 0.93394 | 0.93685 |
| HTZI | Dark Brown | 8.40 | 1.11433 | 1.11763 |

Figure 5:
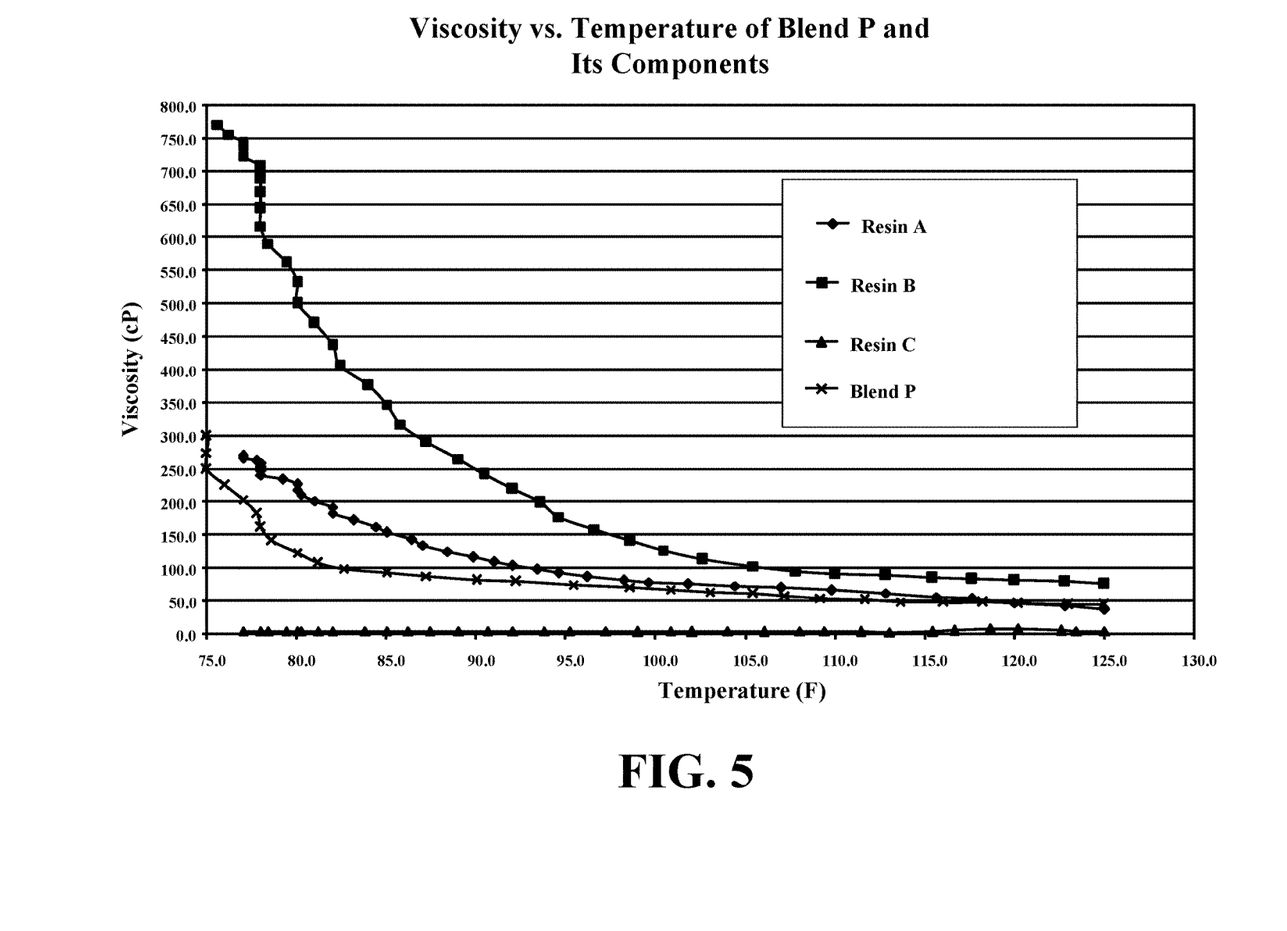
FIG. 5 depicts a viscosity versus temperature plot of an embodiment of a high-temperature zonal isolation composition of this invention compared to its components.

Referring now to FIG. 5, a plot of viscosity versus temperature is shown for the components used in making the HTZI composition and the composition.

Example 2

This example illustrates the formulation of an epoxy zonal isolation composition for mid-temperature applications, where the composition has a set temperature in a mid-temperature range between about 90° F. and about 150° F.

50 grams of DURA COAT 1A™ available from JACAM Chemicals, LLC, of Sterling, KS was added to 50 grams of imodaziline to form a mid-temperature zonal isolation (MTZI) composition of this invention. Table III tabulates the components, the amount and weight percentages of the MTZI composition of this invention.

TABLE III

Mid-Temperature Zone Isolation Composition

| Component | Percent (w/w) | r (g/cm$^3$) |
|---|---|---|
| DURA COAT 1A ™ | 50 | 1.16 |
| Imidazoline | 50 | |
| Total | 100 | |

Example 3

This example illustrates the formulation of an epoxy zonal isolation composition for low-temperature applications, where the composition has a set temperature in a low-temperature range between about 50° F. and about 90° F.

92.5 grams of DURA COAT 1A™ available from JACAM Chemicals, LLC, of Sterling, KS was added to 7.5 grams of pyrrolidine to form a low-temperature zonal isolation (LTZI) composition of this invention. Table IV tabulates the components, the amount and weight percentages of the LTZI composition of this invention.

TABLE IV

Low Temperature Zone Isolation Composition

| Component | Percent (w/w) | r (g/cm$^3$) |
|---|---|---|
| DURA COAT 1A ™ | 92.5 | 1.16 |
| Pyrrolidine | 7.5 | 0.86 |
| Total | 100 | |

All references cited herein are incorporated by reference for every purpose permitted by controlling United States Laws. Although the invention has been disclosed with reference to its preferred embodiments, from reading this description those of skill in the art may appreciate changes and modification that may be made which do not depart from the scope and spirit of the invention as described above and claimed hereafter.

We claim:

1. A composition for temperature dependent zone isolation comprising:
   an epoxy-based composition including:
      about 75 wt. % to about 99 wt. % of an epoxy resin or a plurality of epoxy resins, and
      about 25 wt. % to about 1 wt. % of a low temperature curing system consisting essentially of the molecular species pyrrole ($C_4H_4NH$), pyrrolidine ($C_4H_9N$), pyridine ($C_5H_5N$), piperidine ($C_5H_{11}N$) or mixtures thereof for low temperature borehole temperatures having a value between about 50° F. and about 90° F. to form a low temperature epoxy-based composition,
   wherein the composition cures to form a compressible zonal isolation structure at the zone and wherein the structure maintains substantial integrity after compression.

2. The composition of claim 1, where the compressible zonal isolation structure is placed in a section of an annulus between a borehole and a tubing string so that the zonal isolation structure is located along a length of the tubing string.

3. The composition of claim 1, wherein the compressible zonal isolation structure is compressed during or after curing, when a section of a tubing string is expanded and wherein the compressible zonal isolation structure is sufficiently compressible to form a compressed zonal isolation structure that isolates the expanded tubing section without substantial loss in seal integrity or zonal isolation.

4. The composition of claim 1, wherein the compressible zonal isolation structure is located at a distal end of the borehole.

5. The composition of claim 1, wherein the compressible zonal isolation structure has sufficient compressibility and resilience properties to permit compression of the structure without substantial loss in seal integrity or zonal isolation.

6. The composition of claim 1, the epoxy-based composition further includes:
   a diluent selected from the group consisting of an aromatic solvent, a heterocyclic aromatic solvent and mixtures and combinations thereof.

7. The composition of claim 1, wherein the epoxy resin or epoxy resins are selected from the group consisting of: a) glycidyl ethers epoxy resin prepared by the reaction of epichlorohydrin with a compound containing a hydroxyl group carried out under alkaline reaction conditions; (b) epoxy resins prepared by the reaction of epichlorohydrin with mononuclear di- and tri-hydroxy phenolic compounds;

(c) epoxidized derivatives of natural oils with mixed long chain saturated and unsaturated acids having between about 14 and 20 carbon atoms; (d) polyepoxides derived from esters ofpolycarboxylic acids with unsaturated alcohols; (e) polyepoxides derived from esters prepared from unsaturated alcohols and unsaturated carboxylic acids; (f) epoxidized butadiene based polymers; (g) epoxidized derivatives of dimers of dienes, and (h) mixtures or combinations thereof.

8. The composition of claim 7, wherein the epoxy resins have a molecular weight between about 50 and about 10,000.

9. The composition of claim 7, wherein the glycidyl ethers epoxy resins are prepared by the reaction of epichlorohydrin with a compound containing a hydroxyl group carried out under alkaline reaction conditions.

10. A composition for zone isolation comprising:
an epoxy-based composition including:
a low temperature compositions including about 75 wt. % to about 99 wt. % of an epoxy resin or a plurality of epoxy resins and about 25 wt. % to about 1 wt. % of a low temperature curing system consisting essentially of the molecular species pyrrole ($C_4H_4NH$), pyrrolidine ($C_4H_9N$), pyridine ($C_5H_5N$), piperidine ($C_5H_{11}N$) or mixtures thereof for low temperature borehole temperatures having a value between about 50° F. and about 90° F. to form a low temperature epoxy-based composition,
wherein the composition cures to form a compressible zonal isolation structure at the zone and wherein the structure maintains substantial integrity after compression.

11. The composition of claim 10, the epoxy-based composition further includes:
a diluent selected from the group consisting of an aromatic solvent, a heterocyclic aromatic solvent and mixtures or combinations thereof.

12. The composition of claim 10, wherein the epoxy resin or epoxy resins are selected from the group consisting of: a) glycidyl ethers epoxy resin prepared by the reaction of epichlorohydrin with a compound containing a hydroxyl group carried out under alkaline reaction conditions; (b) epoxy resins prepared by the reaction of epichlorohydrin with mononuclear di- and tri-hydroxy phenolic compounds; (c) epoxidized derivatives of natural oils with mixed long-chain saturated and unsaturated acids having between about 14 and 20 carbon atoms; (d) polyepoxides derived from esters ofpolycarboxylic acids with unsaturated alcohols; (e) polyepoxides derived from esters prepared from unsaturated alcohols and unsaturated carboxylic acids; (f) epoxidized butadiene based polymers; (g) epoxidized derivatives of dimers of dienes, and (h) mixtures or combinations thereof and have molecular weights ranging between about 50 and about 10,000.

13. A composition for zone isolation comprising:
a low temperature composition including:
from about 75 wt. % to about 99 wt. % of a glycidyl ethers epoxy resin or a mixture of glycidyl ethers epoxy resins, and
from about 25 wt. % to about 1 wt. % of the low temperature curing system consisting essentially of the molecular species pyrrole ($C_4H_4NH$), pyrrolidine ($C_4H_9N$), pyridine ($C_5H_5N$), piperidine ($C_5H_{11}N$) or mixtures thereof,
where the low temperature composition cures in a low temperature range between about 50° F. to about 90° F.,
wherein the composition cures to form a compressible zonal isolation structure at the zone and wherein the structure maintains substantial integrity after compression.

14. The composition of claim 13, wherein the glycidyl ethers epoxy resins are prepared by the reaction of epichlorohydrin with a compound containing a hydroxyl group carried out under alkaline reaction conditions and have molecular weights ranging between about 50 and about 10,000.

15. The composition of claim 1, wherein the epoxy resin or a plurality of epoxy resins is present at about 90 wt. % to about 99 wt. % and the low temperature curing system is present at about 10 wt. % to about 1 wt. %.

* * * * *